United States Patent [19]

Ueno et al.

[11] Patent Number: 4,548,867
[45] Date of Patent: Oct. 22, 1985

[54] FLUORINE-CONTAINING SYNTHETIC RESIN SHAPED ARTICLES HAVING IMPROVED SURFACE PROPERTIES AND A METHOD FOR THE PREPARATION THEREOF

[75] Inventors: Susumu Ueno; Hirokazu Nomura, both of Ibaraki; Kiyoshi Imada, Saitama, all of Japan

[73] Assignee: Shin-Etsu Chemical Co., Ltd., Tokyo, Japan

[21] Appl. No.: 521,833

[22] Filed: Aug. 10, 1983

[30] Foreign Application Priority Data

Aug. 13, 1982 [JP] Japan .............................. 57-140661

[51] Int. Cl.[4] .................. C07G 13/00; B32B 27/00
[52] U.S. Cl. .................................. 428/409; 204/169; 427/40; 427/255.6; 428/421; 428/422; 264/22
[58] Field of Search ............... 204/165, 169, 168; 427/40, 255.6; 264/22; 428/421, 422, 409

[56] References Cited

U.S. PATENT DOCUMENTS

| | | | |
|---|---|---|---|
| 3,274,089 | 9/1966 | Wolinski | 204/169 |
| 3,291,712 | 12/1966 | McBride | 204/169 |
| 3,967,027 | 6/1976 | Igarashi | 204/165 |
| 3,992,495 | 11/1976 | Sano | 204/165 |
| 4,056,456 | 11/1977 | Sano | 204/165 |
| 4,261,806 | 4/1981 | Asai | 204/165 |
| 4,276,138 | 6/1981 | Asai | 204/165 |

*Primary Examiner*—John F. Niebling
*Attorney, Agent, or Firm*—Hopgood, Calimafde, Kalil, Blaustein & Judlowe

[57] ABSTRACT

The invention provides a shaped article of a fluorine-containing synthetic resin having improved surface properties such as increased wettability with water, printability, susceptibility to adhesive bonding and less accumulation of static electricity. The improved shaped article is obtained by subjecting the surface of the article to exposure to low temperature plasma generated in a low pressure atmosphere of a nitrogen-containing gaseous organic compound such as amines, imides and amides.

8 Claims, No Drawings

FLUORINE-CONTAINING SYNTHETIC RESIN SHAPED ARTICLES HAVING IMPROVED SURFACE PROPERTIES AND A METHOD FOR THE PREPARATION THEREOF

BACKGROUND OF THE INVENTION

The present invention relates to a shaped article of a fluorine-containing synthetic resin having improved surface properties and a method for the preparation thereof. More particularly, the invention relates to a shaped article of a fluorine-containing synthetic resin having increased wettability, printability, susceptibility to adhesive bonding, moderate antistatic performance and the like improved surface properties and a method for the preparation of such an improved shaped article of a fluorine-containing synthetic resin by the method of treatment of the article with low temperature plasma produced in specific gaseous atmosphere.

As is well known, shaped articles of fluorine-containing synthetic resins, typically represented by polytetrafluoroethylene resins, are very excellent in general in their chemical stability and heat resistance as well as in their electric properties, very low coefficient of friction and weathering resistance. On the other hand, some of their unique surface properties cause several serious problems in the practical use of such shaped articles. Specifically, the surfaces of shaped articles of fluorine-containing synthetic resins have poor wettability with water, poor receptivity of printing inks, insusceptibility to adhesive bonding and extremely strong accumulation of static electricity to cause various disadvantages and inconveniences in the practical application of them so that their application field is narrowly limited.

With an object to solve the above described problems in the shaped articles of a fluorine-containing synthetic resin, several methods have been proposed in the prior art in which the surface of the shaped article is subjected to the treatment by electric corona discharge or to the exposure to an atmosphere of low temperature plasma of an inorganic gas to cause surface oxidation resulting in the improvements of the surface properties to some extent. These methods are, however, far from satisfactory because the improvement obtained thereby is insufficiently low and, moreover, the effect obtained by the above mentioned treatment has very poor durability and permanency.

On the other hand, several attempts have been made by the treatment with chemicals of graft-copolymerization on the surface by utilizing irradiation with actinic rays such as electron beams, ultraviolet light, gamma rays and the like in order to obtain improved surface properties of the shaped articles. These methods are, however, disadvantageous from the practical standpoint due to the complicated process involved in the method and difficulty in obtaining desired degree of improvement presumably due to the extreme chemical stability of the fluorine-containing synthetic resins.

SUMMARY OF THE INVENTION

It is therefore an object of the present invention to provide a novel and improved shaped article of a fluorine-containing synthetic resin having improved surface properties such as increased wettability and printability, increased susceptibility to adhesive bonding and moderate antistatic performance. It is also an object of the present invention to provide a novel and improved method for the preparation of a shaped article of a fluorine-containing synthetic resin having improved surface properties as mentioned above.

Thus, the shaped article of a fluorine-containing synthetic resin provided by the invention as a result of the extensive investigations undertaken by the inventors is characteristic in that the surface thereof has been subjected to exposure to an atmosphere of low temperature plasma under a pressure of 10 Torr or below of a nitrogen-containing gaseous organic compound represented by the general formula

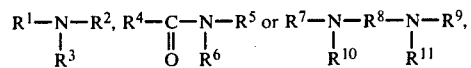

in which $R^1$, $R^7$, and $R^9$ are each a substituted or unsubstituted monovalent hydrocarbon group, $R^2$, $R^3$, $R^4$, $R^5$, $R^6$, $R^{10}$ and $R^{11}$ are each a hydrogen atom or a substituted or unsubstituted monovalent hydrocarbon group and $R^8$ is a substituted or unsubstituted divalent hydrocarbon group.

Consequently, the method of the present invention comprises subjecting the surface of the shaped article of a fluorine-containing synthetic resin to exposure to an atmosphere of low temperature plasma of a nitrogen-containing gaseous organic compound specified above under a pressure of 10 Torr or below.

DETAILED DESCRIPTION OF THE PREFERRED EMBODIMENTS

As is described above, the inventive shaped article of a fluorine-containing synthetic resin has a surface having been subjected to a low temperature plasma treatment in a gaseous atmosphere of a specified nitrogen-containing organic compound and the effect of improvement in the surface properties obtained by this treatment is very remarkable and outstandingly excellent in the durability and permanency in comparison with the effects obtained in a low temperature plasma treatment using a conventional inorganic or organic gaseous compound. This unexpectedly remarkable improvement obtained by the plasma treatment of a specific nitrogen-containing organic compound is presumably due to the formation of an extremely thin layer of modified nature of the surface having a thickness of 0.1 μm or smaller, of which the adhesion to the body of the fluorine-containing synthetic resin is extremely firm and the velocity of its formation is much larger than on the surface of other types of synthetic resins resulting in the very easy and rapid appearance of the effect of improvement in the surface properties of the inventive article.

As indicated in the analytical examination by the surface-reflective infrared spectrophotometry and electron spectrometry such as the ESCA method, such a modified layer actually exists on the surface of the shaped article and can be identified to be a layer of a crosslinked polymer including structures with linkages of R-N, R'=N and R"≡N, where R, R' and R" are each an organic group, and the presence of such a layer is directly visible by use of a scanning-type or transmission-type electron microscope.

Needless to say, the effect of the plasma treatment is limited to the very surface of the shaped article and the excellent properties of the bulk body of the article inherent to the fluorine-containing synthetic resin are little or not at all affected by the plasma treatment including the high chemical stability and heat resistance.

The fluorine-containing synthetic resin of which the inventive shaped article is formed is not particularly limitative including various types of homopolymers and copolymers having carbon-to-fluorine linkages in the molecule in general. Exemplary of the fluorine-containing synthetic resins to which the present invention is applicable are polytetrafluoroethylenes, polychlorotrifluoroethylenes, polyvinylidene fluorides, polyvinyl fluorides, copolymers of tetrafluoroethylene and hexafluoropropene, copolymers of tetrafluoroethylene and a perfluoroalkyl vinyl ether, copolymers of tetrafluoroethylene and ethylene, copolymers of chlorotrifluoroethylene and ethylene, copolymers of vinylidene fluoride and hexafluoro isobutene and the like.

The shaped article of the above named fluorine-containing synthetic resin may be prepared in any conventional molding method without particular limitations including compression molding, ram extrusion molding, paste extrusion molding, calendering and dispersion fabrication as well as extrusion molding, injection molding, melt shaping and the like. The form or configuration of the shaped article is also not particularly limitative provided that uniform exposure of the surface of the article to the plasma atmosphere is ensured. The shaped article may be fabricated with the resin formulated with various kinds of additives conventionally used in the fabrication of fluorine-containing synthetic resins including fillers such as glass fibers, graphite powder, molybdenum disulfide, bronze powder and the like, surface active agents, emulsifiers, stabilizers and plasticizers such as fluorocarbon oils. The effect of improvement in the surface properties by the plasma treatment is little affected by the formulation of these additives.

The most characteristic feature in the inventive shaped article is that the surface thereof has been subjected to the treatment with low temperature plasma of a specific nitrogen-containing gaseous organic compound represented by either one of the above given three general formulas. Exemplary of such nitrogen-containing organic compounds are amines, imines, amides and imides as well as derivatives thereof including methyl amine, dimethyl amine, trimethyl amine, ethyl amine, diethyl amine, triethyl amine, n-propyl amine, di-n-propyl amine, tri-n-propyl amine, n-butyl amine, n-amyl amine, n-hexyl amine, lauryl amine, ethylene diamine, trimethylene diamine, hexamethylene diamine, ethanol amine, diethanol amine, allyl amine, aniline, N-methyl aniline, allyl dimethyl amine, di(2-aminoethyl) ether, 1-dimethylamino-2-chloro ethane, cyclopropyl amine, cyclohexyl amine, ethylene imine, 1-methyl ethylene imine, formamide, N,N-dimethyl formamide, capronamide, aminoacetal, benzyl amine, piperidine, pyrrolidine, morpholine and the like as well as derivatives thereof, of which the non-heterocyclic compounds are preferred. When the nitrogen-containing organic compound has a relatively high boiling point or relatively low vapor pressure at room temperature not suitable for introduction to the plasma atmosphere as such, sufficient vapor pressure can be obtained by heating the compound.

The inventive shaped article of the fluorine-containing synthetic resin is obtained by subjecting the shaped article to exposure to the atmosphere of low temperature plasma of the above named nitrogen-containing organic compound so that the shaped article is imparted with remarkably improved surface properties such as excellent wettability, printability, susceptibility to adhesive bonding and adequately controlled antistatic performance and these improved surface properties are retained durably and permanently during the serviceable life of the shaped article.

The plasma treatment according to the present invention is performed by generating low temperature plasma in a plasma chamber containing the shaped article while the pressure inside the plasma chamber is maintained at 10 Torr or below by continuously introducing the nitrogen-containing gaseous organic compound at a controlled rate into the plasma chamber with simultaneous pumping out so that the surface of the shaped article is exposed to the atmosphere of low temperature plasma of the gas for a desired length of time.

The pressure inside the plasma chamber should be maintained throughout not to exceed 10 Torr or, preferably, in the range from 0.001 Torr to 1 Torr in order to obtain excellent and sufficient effect of improvement of the surface properties. When the pressure in the plasma atmosphere is increased over 10 Torr, the desired effect of improvement rapidly decreases in contrast to the conventional phenomena encountered in the plasma treatment within an atmosphere of other gases and in the plasma polymerization. It is of course that an extremely low pressure below 0.001 Torr is undesirable due to the instability of the electric plasma discharge across such an atmosphere.

The conditions for generating low temperature plasma in a low-pressure atmosphere of a gas is well known in the art. For example, a high-frequency electric power of 10 watts to 100 kilowatts at a frequency of 10 kHz to 100 MHz is supplied to the electrodes of a plasma chamber, the electrodes being installed either inside or outside of the plasma chamber, while the pressure inside the chamber is maintained at a desired low pressure by introducing the specified gas at a controlled rate. Sufficient effects of the plasma treatment can be obtained regardless of the type of the electric discharge which may be glow discharge or corona discharge. The length of time for the plasma treatment may widely differ depending on various factors including types of the synthetic resins, desired effects of improvements, types of the nitrogen-containing organic gaseous compound, conditions of plasma discharge and so on but sufficient improvements can be obtained usually by the treatment for a length of time in the range from a few seconds to several tens of minutes.

It is of course optional that the above specified nitrogen-containing gaseous organic compounds may be used either singly or as a combination of two kinds or more according to need expecting a possible synergistic effect. It is further optional that the gaseous atmosphere of the low temperature plasma is constituted of a gaseous mixture of the nitrogen-containing organic compound and an organic gaseous compound of other types or an inorganic gas such as inert gases, e.g. helium and argon, nitrogen, oxygen, air, hydrogen, water vapor, carbon dioxide, carbon monoxide and the like. The combined use of such additional gases may be effective in some cases to give additional secondary improvements on the properties other than those as the primary object of the present invention. It should be noted, however, that the partial pressure of such an additional gas in the plasma chamber is desirably 0.5 Torr or below or smaller than one tenth of the partial pressure of the essential gaseous component of the specified nitrogen-containing organic compound.

Following are the examples to illustrate the invention in further detail but not to limit the scope of the invention in any way. In the following examples, the effectiveness of the plasma treatment of the shaped articles of fluorine-containing synthetic resins according to the invention was evaluated by measuring several surface properties of the articles before and after the treatment including the contact angle of water on the surface as a measure of the wettability, receptivity of printing inks as a measure of the printability, adhesive bonding strength by use of two kinds of adhesives and charge voltage by rubbing as a measure of the antistatic performance. The procedures for the measurement of these items were as follows.

Receptivity of printing inks: a printing ink was uniformly applied on to the surface of the test specimen and the completely dried film of the printing ink was cut with a sharp knife in a checkerboard-like manner at 1 mm intervals of the incision lines in each direction to make 100 squares of each 1 mm × 1 mm wide. Then, a commercially available adhesive tape of sufficient width was applied and bonded by pressing on to the area of the specimen surface cut in the above manner and the adhesive tape was peeled off at a peeling velocity of 10 cm/second to examine the number of the 1 mm × 1 mm squares of the ink film left on the surface unremoved by the adhesive tape.

Susceptibility to adhesive bonding: two pieces of the test specimen each 1 inch wide and 3 inches long were prepared. One of them was coated with an adhesive uniformly on the 1 inch × 1 inch area at one end and the other test piece was exactly laid thereon. After curing of the adhesive at 50° C. for 7 days, the test pieces were pulled apart at a pulling velocity of 200 mm/minute in a 90° direction to determine the strength of adhesive bonding in kg/inch. The adhesive used was either Araldite (a tradename of a modified epoxy adhesive manufactured by Ciba Geigy Co., hereinafter referred to as adhesive A) or Bond KU15A (a tradename of a urethane adhesive manufactured by Konishi & Co., hereinafter referred to as adhesive B).

Charge voltage by rubbing: the test specimen was rubbed in a rotary static tester and the charge voltage was determined after 1 minute from the beginning of rubbing. The rubbing body was a cotton cloth under a tension of 200 g and the rubbing rate on the test surface was 750 times per minute.

EXAMPLE 1

(Experiments No. 1 and No. 2)

A sheet of polytetrafluoroethylene resin (Teflon TFE, a product by E. I. DuPont Co.) was placed in a plasma chamber of a low temperature plasma generator and, after evacuation of the chamber to a pressure of $10^{-4}$ Torr, vapor of ethylamine was introduced into the chamber at a controlled rate to give a constant inside pressure of 0.1 Torr. Low temperature plasma was generated for 2 minutes inside the plasma chamber by applying a high frequency electric power of 400 watts at a frequency of 13.56 MHz to the electrodes so as to expose the surface of the resin sheet to the low temperature plasma.

Measurement of the surface properties of the test specimen undertaken before (Experiment No. 1) and after (Experiment No. 2) the plasma treatment in the above described manner gave the results shown in the Table given below.

EXAMPLE 2

(Experiment No. 3)

The same polytetrafluoroethylene resin sheet as used in Example 1 was plasma-treated in substantially the same manner as in Example 1 excepting the replacement of ethylamine with methylamine, reduction of the pressure from 0.1 Torr to 0.05 Torr, decrease of the high frequency electric power from 400 watts to 200 watts and extension of the treatment time from 2 minutes to 5 minutes.

The Table gives the results of the surface property measurement of the thus plasma-treated resin sheet.

EXAMPLE 3

(Experiments No. 4 to No. 7)

The same polytetrafluoroethylene resin sheet as used in Example 1 was placed in the plasma chamber and, after evacuation of the chamber to a pressure of $10^{-5}$ Torr, air was introduced into the chamber at a controlled rate to give a constant inside pressure of 0.05 Torr or 0.1 Torr. Then, vapor of methylamine was introduced into the chamber at a controlled rate so as to give a constant partial pressure of from 0.1 to 1.5 Torr of the methylamine vapor mixed with the air inside the chamber. Low temperature plasma was generated inside the plasma chamber for 20 seconds by applying a high frequency electric power of 3 kilowatts at a frequency of 110 kHz to the electrodes so as to expose the surface of the resin sheet to the low temperature plasma.

The Table below gives the results of the surface property measurement of the thus treated resin sheets along with the partial pressures of air and methylamine vapor.

EXAMPLE 4

(Experiments No. 8 and No. 9)

A sheet of polyvinyl fluoride resin (Tedlar, a product by E. I. Du Pont Co.) was placed in the plasma chamber of the plasma generator and, after evacuation of the chamber to a pressure of $10^{-2}$ Torr, argon gas was introduced into the chamber at a controlled rate so as to give a constant pressure of 0.2 Torr under flow of argon gas. Then, vapor of allylamine was introduced into the chamber at a controlled rate and mixed with the argon gas so as to give partial pressures of argon and allylamine of each 0.2 Torr. Low temperature plasma was generated in the thus controlled inside atmosphere of the plasma chamber for 1 minute by applying a high frequency electric power of 1 kilowatt at a frequency of 13.56 MHz to the electrodes so as to expose the surface of the resin sheet to the low temperature plasma.

The surface properties of the resin sheet before (Experiment No. 8) and after (Experiment No. 9) the plasma treatment were measured in the above described manner to give the results shown in the Table given below.

EXAMPLE 5

(Experiment No. 10)

The same polyvinyl fluoride resin sheet as used in the preceding example was placed in the plasma chamber and, after evacuation of the chamber to a pressure of $10^{-5}$ Torr, carbon dioxide gas was introduced into the chamber at a controlled rate to give a constant pressure of 0.1 Torr inside the chamber. Then, vapor of ethylene diamine was introduced into the chamber at a controlled rate and mixed with the carbon dioxide gas therein so as to give partial pressures of carbon dioxide and ethylene diamine vapor of 0.1 Torr and 0.3 Torr, respectively. Low temperature plasma was generated for 10 seconds in the thus controlled atmosphere of the plasma chamber by applying a high frequency electric power of 5 kilowatts at a frequency of 110 kHz to the electrodes so as to expose the surface of the resin sheet to the low temperature plasma.

The surface properties of the thus plasma-treated resin sheet were as shown in the Table as measured in the above described manner.

EXAMPLE 6

(Experiments No. 11 and No. 12)

A copolymeric resin sheet of tetrafluoroethylene and ethylene (Aflon, a product by Asahi Glass Co.) was placed inside the plasma chamber and, after evacuation of the chamber to a pressure of $10^{-2}$ Torr, vapor of trimethylamine was introduced into the chamber at a controlled rate to give a constant pressure of 0.08 Torr inside the chamber. Low temperature plasma was generated for 2 minutes in the thus controlled atmosphere of the plasma chamber by applying a high frequency electric power of 500 watts at a frequency of 13.56 MHz to the electrodes so as to expose the surface of the resin sheet to the low temperature plasma.

The surface properties of the resin sheet were measured before (Experiment No. 11) and after (Experiment No. 12) the plasma treatment in the above described manner to give the results shown in the Table.

EXAMPLE 7

(Experiment No. 13)

The same copolymeric resin sheet as used in the preceding example was placed in the plasma chamber and, after evacuation of the chamber to a pressure of $10^{-4}$ Torr, vapor of formamide was introduced into the chamber at a controlled rate to give a constant pressure of 0.05 Torr inside the chamber under flow of the vapor. Then, vapor of acetic acid was introduced into the chamber at a controlled rate and mixed with the vapor of formamide so as to give constant partial pressures of formamide vapor and acetic acid vapor of 0.05 Torr and 0.03 Torr, respectively. Low temperature plasma was generated for 1 minute in the thus controlled atmosphere of the plasma chamber by applying a high frequency electric power of 2 kilowatts at a frequency of 110 kHz to the electrodes so as to expose the resin sheet to the low temperature plasma.

The surface properties of the thus plasma-treated resin sheet were as shown in the Table as measured in the above described manner.

| Experiment No. | Partial pressures in atmosphere (Torr) | | Contact angle of water, degrees | Adhesion of printing ink, number of remaining squares | Adhesive strength kg/inch, with adhesive | | Charge voltage by rubbing, volts |
|---|---|---|---|---|---|---|---|
| | N-containing organic gas | Inorganic and other gases | | | A | B | |
| 1* | — | — | 132 | 0 | 0 | 0 | 7750 |
| 2 | Ethylamine (0.1) | — | 42 | 93 | 14 | 9 | 210 |
| 3 | Methylamine (0.05) | — | 51 | 96 | 15 | 12 | 380 |
| 4 | Dimethylamine (0.1) | Air (0.05) | 47 | 94 | 17 | 10 | 230 |
| 5 | Dimethylamine (0.5) | Air (0.05) | 40 | 90 | 13 | 9 | 310 |
| 6 | Dimethylamine (0.2) | Air (0.01) | 49 | 98 | 17 | 11 | 170 |
| 7 | Dimethylamine (1.5) | Air (0.1) | 38 | 77 | 8 | 5 | 850 |
| 8* | — | — | 113 | 0 | 0 | 0 | 6300 |
| 9 | Allylamine (0.2) | Argon (0.2) | 38 | 91 | 15 | 14 | 250 |
| 10 | Ethylenediamine (0.3) | Carbon dioxide (0.1) | 38 | 93 | 17 | 17 | 390 |
| 11* | — | — | 108 | 0 | 0 | 0 | 5500 |
| 12 | Trimethylamine (0.08) | — | 36 | 97 | 13 | 11 | 210 |
| 13 | Formamide (0.05) | Acetic acid (0.03) | 45 | 91 | 13 | 10 | 390 |

*Comparative experiment without plasma treatment

What is claimed is:

1. A shaped article of a fluorine containing synthetic resin characterized in that the surface thereof has been subjected to exposure to an atmosphere of low temperature plasma under a pressure of 10 Torr or below comprising a nitrogen-containing gaseous organic compound represented by the general formula

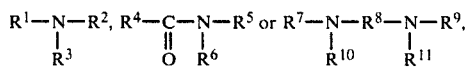

in which $R^1$, $R^7$, and $R^9$ are each a substituted or unsubstituted monovalent hydrocarbon group, $R^2$, $R^3$, $R^4$, $R^5$, $R^6$, $R^{10}$ and $R^{11}$ are each a hydrogen atom or a substituted or unsubstituted monovalent hydrocarbon group and $R^8$ is a substituted or unsubstituted divalent hydrocarbon group.

2. A method for improving the surface properties of a shaped article of a fluorine-containing synthetic resin which comprises subjecting the surface of the shaped article to exposure to an atmosphere of low temperature plasma under a pressure of 10 Torr or below comprising a nitrogen-containing gaseous organic compound represented by the general formula

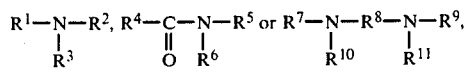

in which $R^1$, and $R^7$, and $R^9$ are each a substituted or unsubstituted monovalent hydrocarbon group, $R^2$, $R^3$, $R^4$, $R^5$, $R^6$, $R^{10}$ and $R^{11}$ are each a hydrogen atom or a substituted or unsubstituted monovalent hydrocarbon group and $R^8$ is a substituted or unsubstituted divalent hydrocarbon group.

3. The method as claimed in claim 2 wherein the nitrogen-containing gaseous organic compound is selected from the class consisting of methyl amine, dimethyl amine, trimethyl amine, ethyl amine, diethyl amine, triethyl amine, n-propyl amine, di-n-propyl amine, tri-n-propyl amine, n-butyl amine, n-amyl amine, n-hexyl amine, lauryl amine, ethylene diamine, trimethylene diamine, hexamethylene diamine, ethanol amine, diethanol amine, allyl amine, aniline, N-methyl aniline, allyl dimethyl amine, di(2-aminoethyl) ether, 1-dimethylamino-2-chloro ethane, cyclopropyl amine, cyclohexyl amine, ethylene imine, 1-methyl ethylene imine, formamide, N,N-dimethyl formamide, capronamide, aminoacetal, benzyl amine, piperidine, pyrrolidine and morpholine.

4. The method as claimed in claim 2 wherein the pressure of the nitrogen-containing gaseous organic compound is in the range from 0.001 Torr to 1 Torr.

5. A shaped article of a fluorine containing synthetic resin characterized in that the surface thereof has been subjected to exposure to an atmosphere consisting essentially of low temperature plasma under a pressure of 10 Torr or below of a nitrogen-containing gaseous organic compound represented by the general formula

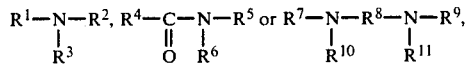

in which $R^1$, $R^7$, and $R^9$ are each a substituted or unsubstituted monovalent hydrocarbon group, $R^2$, $R^3$, $R^4$, $R^5$, $R^6$, $R^{10}$ and $R^{11}$ are each a hydrogen atom or a substituted or unsubstituted monovalent hydrocarbon group and $R^8$ is a substituted or unsubstituted divalent hydrocarbon group whereby the surface of the article has a thin modified layer of less than about 0.1 micron in thickness.

6. A method for improving the surface properties of a shaped article of a fluorine-containing synthetic resin which comprises subjecting the surface of the shaped article to exposure to an atmosphere consisting essentially of low temperature plasma under a pressure of 10 Torr or below of a nitrogen-containing gaseous organic compound represented by the general formula

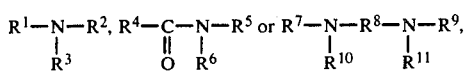

in which $R^1$, $R^7$, and $R^9$ are each a substituted or unsubstituted monovalent hydrocarbon group, $R^2$, $R^3$, $R^4$, $R^5$, $R^6$, $R^{10}$ and $R^{11}$ are each a hydrogen atom or a substituted or unsubstituted monovalent hydrocarbon group and $R^8$ is a substituted or unsubstituted divalent hydrocarbon group.

7. The method as claimed in claim 6 wherein the nitrogen-containing gaseous organic compound is selected from the group consisting of methyl amine, dimethyl amine, trimethyl amine, ethyl amine, diethyl amine, triethyl amine, n-propyl amine, di-n-propyl amine, tri-n-propyl amine, n-butyl amine, n-amyl amine, n-hexyl amine, lauryl amine, ethylene diamine, trimethylene diamine, hexamethylene diamine, ethanol amine, diethanol amine, allyl amine, aniline, N-methyl aniline, allyl dimethyl amine, di(2-aminoethyl) ether, 1-dimethylamino-2-chloro ethane, cyclopropyl amine, cyclohexyl amine, ethylene imine, 1-methyl ethylene imine, formamide, N,N-dimethyl formamide, capronamide, aminoacetal, benzyl amine, piperidine, pyrrolidine and morpholine.

8. The method as claimed in claim 6 wherein the presure of the nitrogen-containing gaseous organic compound is in the range from 0.001 Torr to 1 Torr.

* * * * *